Aug. 9, 1960   D. H. SCHAEFER   2,948,473
STATIC ANALOGUE DIVIDER
Filed March 20, 1956
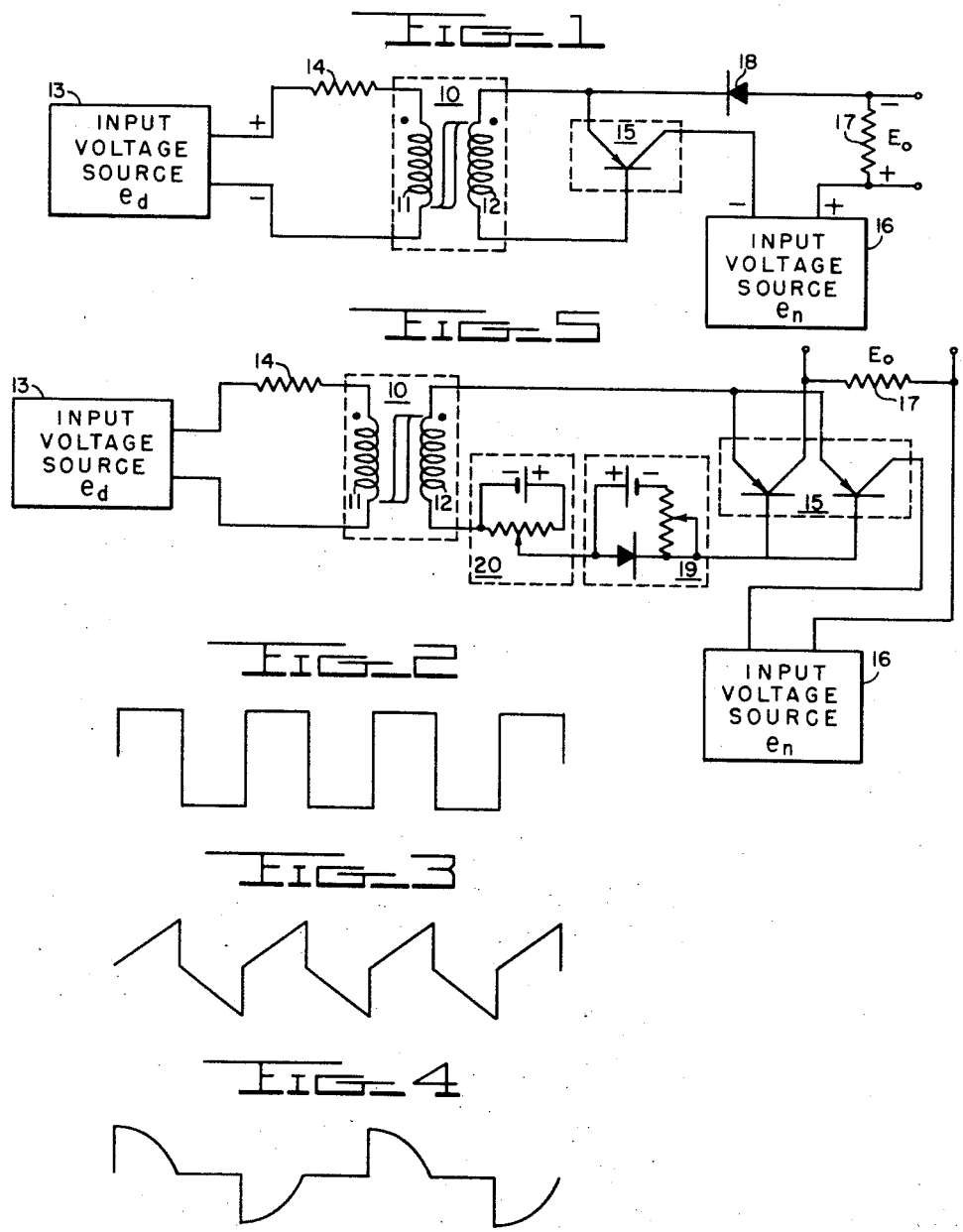
INVENTOR
DAVID H. SCHAEFER
BY *W.R. Malt*
*Richard C. Ree*
ATTORNEYS

United States Patent Office 2,948,473
Patented Aug. 9, 1960

2,948,473
STATIC ANALOGUE DIVIDER

David H. Schaefer, % Naval Research Laboratory, Washington 25, D.C.

Filed Mar. 20, 1956, Ser. No. 572,777

8 Claims. (Cl. 235—196)

(Granted under Title 35, U.S. Code (1952), sec. 266)

The invention described herein may be manufactured and used by or for the Government of the United States of America for governmental purposes without the payment of any royalties thereon or therefor.

This invention relates in general to magnetic computing circuits and in particular to a static, high speed computing means for producing an output voltage which is an analogue function of two input voltages.

A wide variety of computing devices are available for combining two input voltages to obtain a third voltage proportional to the sum, difference, product or quotient of two input voltages. In general, however, most of these prior art computing devices are characterized by cumbersome size and complex circuitry. In addition, many are subject to serious operational complications due to a critical reliance on the relatively indeterminate stability of their principal element, vacuum tubes.

It will be appreciated that it is sometimes desirable to employ the proportionate function of two voltages as a control voltage. In many such instances the prior art devices are unsuitable since it is usually desirable that the computing device be especially compact as well as capable of producing a reasonably reliable output voltage.

Accordingly:

It is an object of this invention to provide a compact high speed computing means for producing an output voltage which is an analogue function of two input voltages.

It is another object of this invention to provide a reasonably accurate magnetic computing means, which employs core material having a substantially rectangular hysteresis characteristic.

It is still another object of this invention to provide a static, transistorized analogue computing means.

Other objects of the invention will become apparent upon a more comprehensive understanding of the invention for which reference is had to the attached specification and drawings.

In the drawings:

Fig. 1 is a schematic showing of one embodiment of the invention.

Figs. 2, 3 and 4 are graphical showings of various input voltage waveforms which might be employed with the embodiment of Fig. 1.

Fig. 5 is a schematic showing of a four quadrant divider in accordance with the present invention.

A rectangle is drawn between the transformer windings in Figs. 1 and 5 to indicate a core material having a substantially rectangular hysteresis characteristic.

Briefly, this invention employs a core material having a substantially rectangular hysteresis characteristic, and a PNP transistor switching means in a saturation period controlled device to produce a simplified high speed analogue computing means. In the invention, the first input voltage is applied to an input winding on the core for the purpose of saturating the core. This first input voltage, therefore, must be of sufficient magnitude to bring the core material from one saturation level to the other. By the connection of the transistor switching means to a second winding on the core, means are provided for applying a second input voltage across the load impedance during the time interval required to saturate the core. Thus, the device provides a pulsed output wherein each output pulse is characterized by a magnitude instantaneously proportional to the magnitude of one input voltage and a width bearing some functional relationship to the magnitude of the other input voltage. Therefore, the average output voltage represents an analogue function of the two input voltages. The invention utilizes a unique property of magnetic cores having a substantially rectangular hysteresis characteristic—the number of volt seconds required to drive the core from one saturation level to the other is a constant value for each individual core. A principal utility of the device is to provide an average output voltage proportional to the quotient of two input voltages.

Referring now to the drawings:

Fig. 1 depicts a simplified embodiment of the invention which is demonstrative of the basic principle of operation of this invention. In this embodiment a magnetic core material having a substantially rectangular hysteresis characteristic is utilized for the transformer 10. A voltage source 13, which provides an alternating voltage $e_d$ of significant magnitude, is connected via the impedance 14 across the input winding 11 of transformer 10. The primary function of voltage source 13 is to bring the core material of transformer 10 from one saturation level to the other and it is an essential requirement of this invention that the alternating voltage output of voltage source 13 be of sufficient magnitude to accomplish this status transversal from one saturation level to the other.

It will be seen that the impedance 14 is not essential to the basic concept of the invention. This current limiting impedance is provided merely to prevent a short circuit of the voltage source 13 once the saturation level of the core material is reached and the impedance of winding 11 drops to a minimum value.

The winding 12 of transformer 10, having the dot indicated phase relation to the input winding 11, is connected to a voltage sensitive switching means 15 which is operative to connect the output voltage $e_n$ of voltage source 16 across the load impedance 17. The switching means 15 is sensitive to the magnitude and polarity of the voltage across the winding 12 and is so connected to complete the circuit which applies voltage source 16 across the load impedance 17, during the time interval required to saturate the core material. Thus the switching means is closed during the saturating period but once saturation takes place, the voltage across the winding 12 drops to a minimum and opens the switch.

In the exemplary embodiment of Fig. 1 a single PNP type transistor is shown connected as the switching means 15. While other types of voltage sensitive means might be employed it has been found that transistor switching means are particularly adaptable to the present invention and afford considerable advantage thereto.

In basic explanation of the operation of a PNP type transistor as a switching element, the collector to emitter impedance of such transistors becomes very high when both the collector and emitter voltages are equal to or more negative than the base voltage. As soon as the base becomes slightly negative with respect to either collector or emitter, however, the emitter-collective impedance drops to the vicinity of one ohm.

In Fig. 1, the emitter and base of the transistor switching means 15 are connected across the winding 12. Thus, when the dotted end of winding 12 is positive with respect to the undotted end of the winding the transistor will be in the conducting state and the instantaneous voltage $e_n$ will appear across the load impedance 17. If the dotted end of the winding 12 is negative with respect to the undotted end, or if there is no voltage differential across the winding, the transistor will be in a non-conducting state and no voltage will appear across the load impedance 17. Thus, in the embodiment of Fig. 1 the instantaneous voltage $e_n$ will appear across the load impedance whenever the denominator voltage $e_d$ is positive and core is not saturated. Also, in the embodiment of Fig. 1, a unidirectional element 18 is interposed between the voltage source 16 and the load impedance 17 circuitry. As will be seen, this unidirectional element is nonessential to the basic concept of the invention and is provided merely to permit the use of either an A.C. or D.C. voltage input $e_n$.

In mathematical analysis of the core saturation phase of the invention, the following integral is expressive of the observed requirement for bringing the core material from one saturation level to the other;

$$\int_0^{t_s} e_d dt = K \qquad (1)$$

where $e_d$ is considered the alternating voltage input applied to the input winding 11, the limit $t_s$ is the time required to bring the core material from one saturation level to the other, K is a characteristic constant for a given core measured in volt-seconds, and time is measured from the beginning of a half cycle of the alternating voltage $e_d$.

In similar mathematical analysis of the output circuitry, the following integral is expressive of the output voltage $e_o$, which is the average voltage across the load impedance;

$$\int_0^{t_s} e_n dt = e_o \qquad (2)$$

where $e_n$ is the output waveform of voltage source 16, and again $t_s$ is the time required to bring the core material from one saturation level to the other.

In this invention the input voltages $e_d$ and $e_n$ may have any desired waveform. However, in its principal utility, as a simple divider, it will be appreciated that the device of this invention should have input voltages of similar waveform and phase.

To simplify the mathematical analysis which follows, the input voltage $e_d$ and $e_n$ will first be considered as square waves, as shown in Fig. 2.

In accordance therewith, it will be seen that Equation 1 reduces to $$e_d t_s = K \qquad (3)$$

or $$t_s = \frac{K}{e_d} \qquad (4)$$

Likewise, Equation 2 reduces to $$e_o = e_n t_s \qquad (5)$$

Substituting Equation 4, Equation 5 becomes $$e_o = e_n \frac{K}{e_d} \qquad (6)$$

Thus it will be seen that, with square input waveform voltages, the average output $e_o$ is directly proportional to the quotient of the two input voltages. It has been found that this proportion exists irrespective of the particular input waveform employed as long as both inputs have identical waveforms.

Other waveforms, such as the waveform $Et^n$ shown in Fig. 3 and the waveform $E \cos \omega t$ shown in Fig. 4, might readily be employed as either the input voltage $e_d$ or $e_n$ in this invention. In each instance, the average output, $e_o$, will be a function of the input voltage $e_n$ times some function of the input voltage $e_d$. For example, with input voltage $e_d$ having the waveform, $E \cos \omega t$, and the voltage $e_n$ having the waveform $Et^n$.

$$e_o \sim e_n \left[ \arcsin \frac{K}{e_d} \right]^{n+1} \qquad (7)$$

Likewise, with input voltage $e_d$ having the waveform $Et^n$ and the input voltage $e_n$ having the waveform $E \cos \omega t$ $$e_o \sim e_n \sin \frac{K}{e_d \frac{1}{n+1}} \qquad (8)$$

A second embodiment of the invention which is the subject of a copending application No. 591,000 of D. H. Schaefer et al., filed June 12, 1956, now Patent No. 2,850,236, is shown in Fig. 5. This embodiment is operative in substantially the same manner as the embodiment of Fig. 1 with the notable exception that this embodiment is operative as a four quadrant divider. That is, whereas the embodiment of Fig. 1 has a unidirectional output, since it considers only positive or negative swings of the input voltages, this improved embodiment can consider both positive and negative swings of the input voltages and can thus provide either a positive or negative output as the input voltage polarities indicate. For a more detailed description of this embodiment reference is had to the above referred to copending application.

It has been found that the embodiment exemplarily described in detail above may be ruggedly constructed in an extremely light and compact manner. In addition, it has been found that this embodiment is relatively unaffected by temperature conditions. An average accuracy of ±2.5% has been obtained with this embodiment. It is seen that by a more discriminative selection of circuit components greater accuracy may be readily attainable.

It will be appreciated that the input voltage combinations described herein are merely exemplary of the wide variety of input waveforms which may be employed in this invention and it is clearly understood that other input voltage waveforms may be substituted as desired. In particular, it is understood that a D.C. voltage might be employed for both the input $e_d$ and the input $e_n$. Of course, where a D.C. voltage is employed as the input $e_d$, auxiliary means should be provided for periodically returning the core to its previous saturation level.

Finally, it is understood that this invention is to be limited only by the scope of the claims appended hereto.

What is claimed is:

1. An analogue computing device comprising a core of a material having a substantially rectangular hysteresis characteristic, first and second mutually inductive windings wound thereon, a first voltage source of sufficient magnitude to bring said core material from one saturation level to the other, means applying said first voltage source across said first winding, an output load impedance, a second voltage source, plus on-off switching means having control means for controlling the operational state thereof, means connecting said control means to said second winding such that said switching means is responsive to the polarity of the voltage across said second winding and said operational state is determined thereby, means serially connecting said second voltage source and said on-off switching means across said output load impedance, said switching means being operative to apply said second voltage source across said output load impedance for the period required for said core material to be brought from one saturation level to the other by said first voltage source.

2. An analogue computing device comprising a core of a material having a substantially rectangular hysteresis characteristic, first and second mutually inductive windings wound thereon, a first voltage source of sufficient magnitude to bring said core material from one saturation level to the other, means applying said first voltage source across said first winding, said applying means including a current limiting means in series therewith for controlling the amount of current flow in the circuit once a saturation level is reached, an output load impedance, a second voltage source, plus on-off switching means having control means for controlling the operational state thereof, means connecting said control means to said second winding such that said switching means is responsive to the polarity of the voltage across said second winding and said operational state is determined thereby, means serially connecting said second voltage source and said on-off switching means across said output load impedance, said switching means being operative to apply said second voltage source across said output load impedance for the period required for said core material to be brought from one saturation level to the other by said first voltage source.

3. An analogue computing device comprising a core of a material having a substantially rectangular hysteresis characteristic, first and second mutually inductive windings wound thereon, a first voltage source of sufficient magnitude to bring said core material from one saturation level to the other, means applying said first voltage source across said first winding, an output load impedance, a second voltage source, plus a transistor switching means connected across said second winding and responsive to the polarity of the voltage thereacross, said switching means being operative to apply second voltage source across said output load impedance for the period required for said core material to be brought from one saturation level to the other by said first voltage source.

4. An analogue computing device comprising a core of a material having a substantially rectangular hysteresis characteristic, first and second mutually inductive windings wound thereon, first voltage source of sufficient magnitude to bring said core material from one saturation level to the other, means applying said first voltage source across said first winding, an output load impedance, a second voltage, plus a PNP type transistor switching means having base and emitter connections thereof connected across said second winding such that the switching means is responsive to the polarity of the voltage thereacross, said switching means being operative to apply said second voltage source across said output load impedance for the period required for said core material to be brought from one saturation level to the other by said first voltage source.

5. An analogue computing device comprising a core of a material having a substantially rectangular hysteresis characteristic, first and second mutually inductive windings wound thereon, a first voltage source of sufficient magnitude to bring said core material from one saturation level to the other, means applying said first voltage source across said first winding, said applying means including a current limiting means in series therewith for controlling the amount of current flow in the circuit once a saturation level is reached, an output load impedance, a second voltage source, plus a PNP type transistor switching means having base and emitter connections thereof connected across said second winding such that the switching means is responsive to the polarity of the voltage thereacross, said switching means being operative to apply said second voltage source across said output load impedance for the period required for said core material to be brought from one saturation level to the other by said first voltage source.

6. An analogue computing device comprising a core of a material having a substantially rectangular hysteresis characteristic, first and second windings wound thereon, a first voltage source of sufficient magnitude to bring said core material from one saturation level to the other, means applying said first voltage source across said first winding, an output load impedance, a second voltage source, plus on-off switching means having control means for controlling the operational state thereof, means connecting said control means to said second winding such that said switching means is responsive to a voltage across said second winding and said operational state is determined thereby, a unidirectional element, means serially connecting said second voltage source, said on-off switching means and said unidirectional element across said output load impedance, said switching means being operative to apply said second voltage source through said unidirectional element across said output load impedance for the period required for said core material to be brought from one saturation level to the other by said first voltage source.

7. An analogue computing device comprising a core of a material having a substantially rectangular hysteresis characteristic, first and second mutually inductive windings wound thereon, a first voltage source of sufficient magnitude to bring said core material from one saturation level to the other, means applying said first voltage source across said first winding, means for periodically returning said core material to its original saturation level, an output load impedance, a second voltage source, plus on-off switching means having control means for controlling the operational state thereof, means connecting said control means to said second winding such that said switching means is responsive to the polarity of the voltage across said second winding and said operational state is determined thereby, means serially connecting said second voltage source and said on-off switching means across said output load impedance, said switching means being operative to apply said second voltage source across said output load impedance for the period required for said core material to be brought from one saturation level to the other by said first voltage source.

8. A computing device for obtaining an analogue function of the combined output of two voltage sources comprising a core of a material having a substantially rectangular hysteresis characteristic, at least one inductive winding wound thereon, a first voltage source for bringing said core material from one saturation level to the other, means applying said first voltage source across an inductive winding on said core material, an output load impedance, a second voltage source, and on-off switching means having control means for controlling the operational state thereof, means connecting said control means to said first voltage applying means such that said switching means is responsive to the output thereof and said operational state is determined thereby, means serially connecting said second voltage source and said on-off switching means across said output load impedance, said switching means being operative to apply said second voltage source across said output load impedance for the period required for said core material to be brought from one saturation level to the other by said first voltage source.

References Cited in the file of this patent

UNITED STATES PATENTS

| 2,704,842 | Goodell et al. | Mar. 22, 1955 |
| 2,760,088 | Pittman et al. | Aug. 21, 1956 |
| 2,773,132 | Bright | Dec. 4, 1956 |
| 2,798,169 | Eckert | July 2, 1957 |
| 2,898,043 | Mathias et al. | Aug. 4, 1959 |

OTHER REFERENCES

Schaefer: Transactions of the AIEE, November 1955, pages 652–655.

Van Allen: Transactions of the AIEE, November 1955, pages 643–648.